Jan. 31, 1956　　　A. C. GRIMM ET AL　　　2,733,366
TARGET ASSEMBLIES FOR COLOR-KINESCOPES, ETC
Filed Nov. 6, 1952

INVENTORS
ALBERT C. GRIMM
AND MILTON J. GRIMES
BY Roderick Malcolm
ATTORNEY

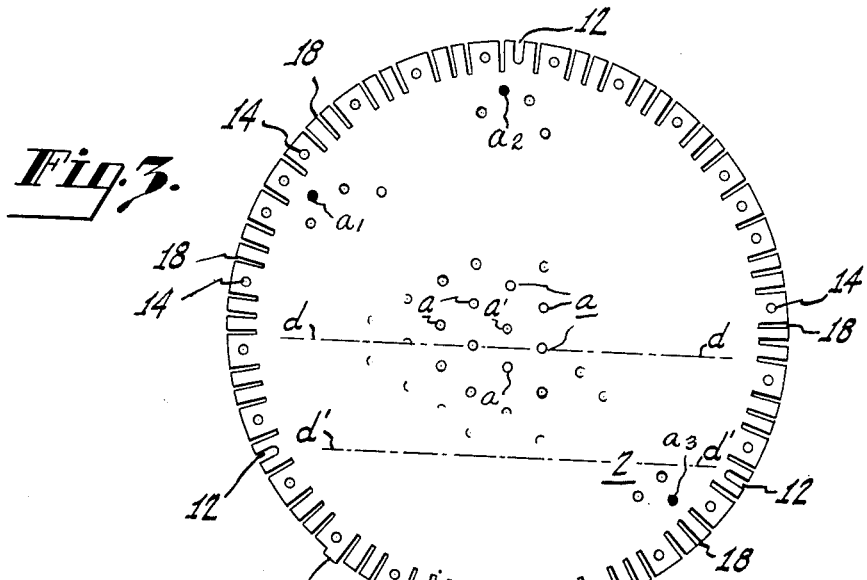
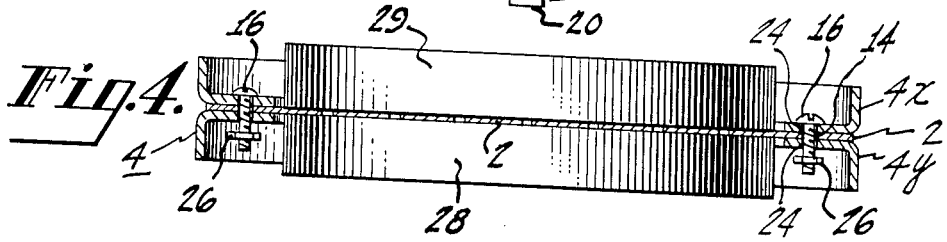
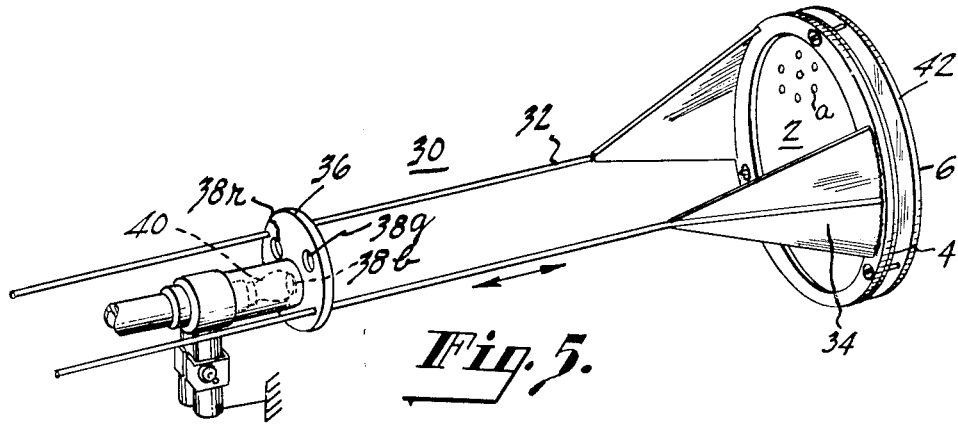

Jan. 31, 1956
A. C. GRIMM ET AL
2,733,366
TARGET ASSEMBLIES FOR COLOR-KINESCOPES, ETC
Filed Nov. 6, 1952
7 Sheets-Sheet 3
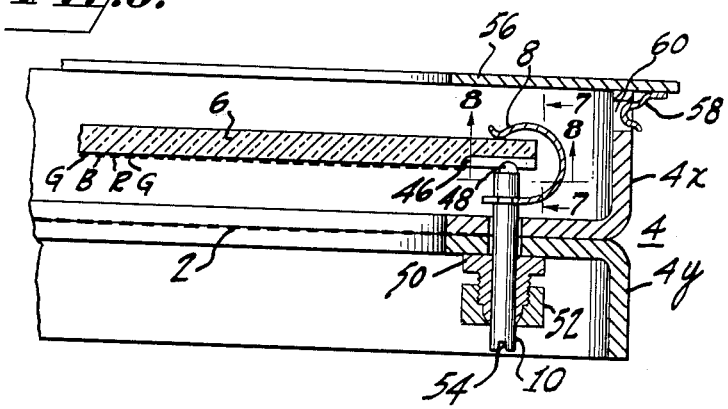
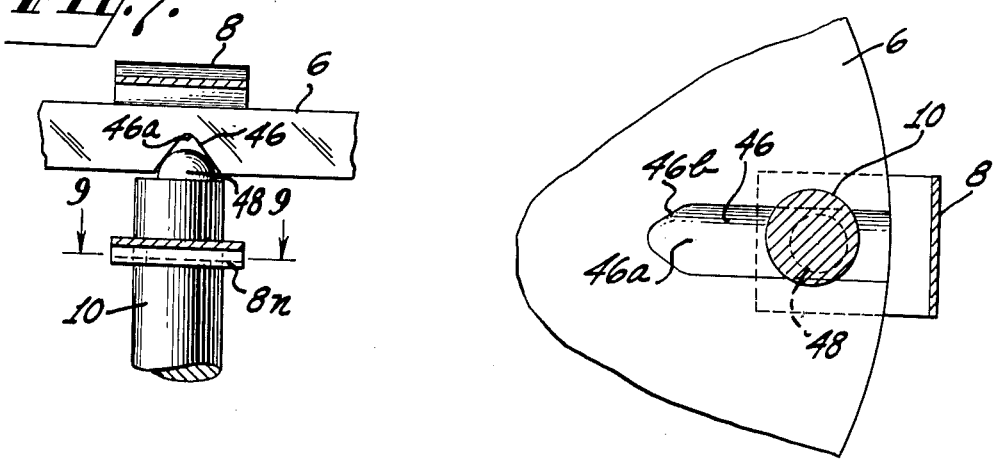
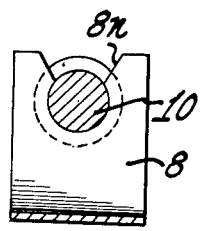
INVENTORS
ALBERT G. GRIMM AND
MILTON J. GRIMES
BY Rodindo Malrolm
ATTORNEY

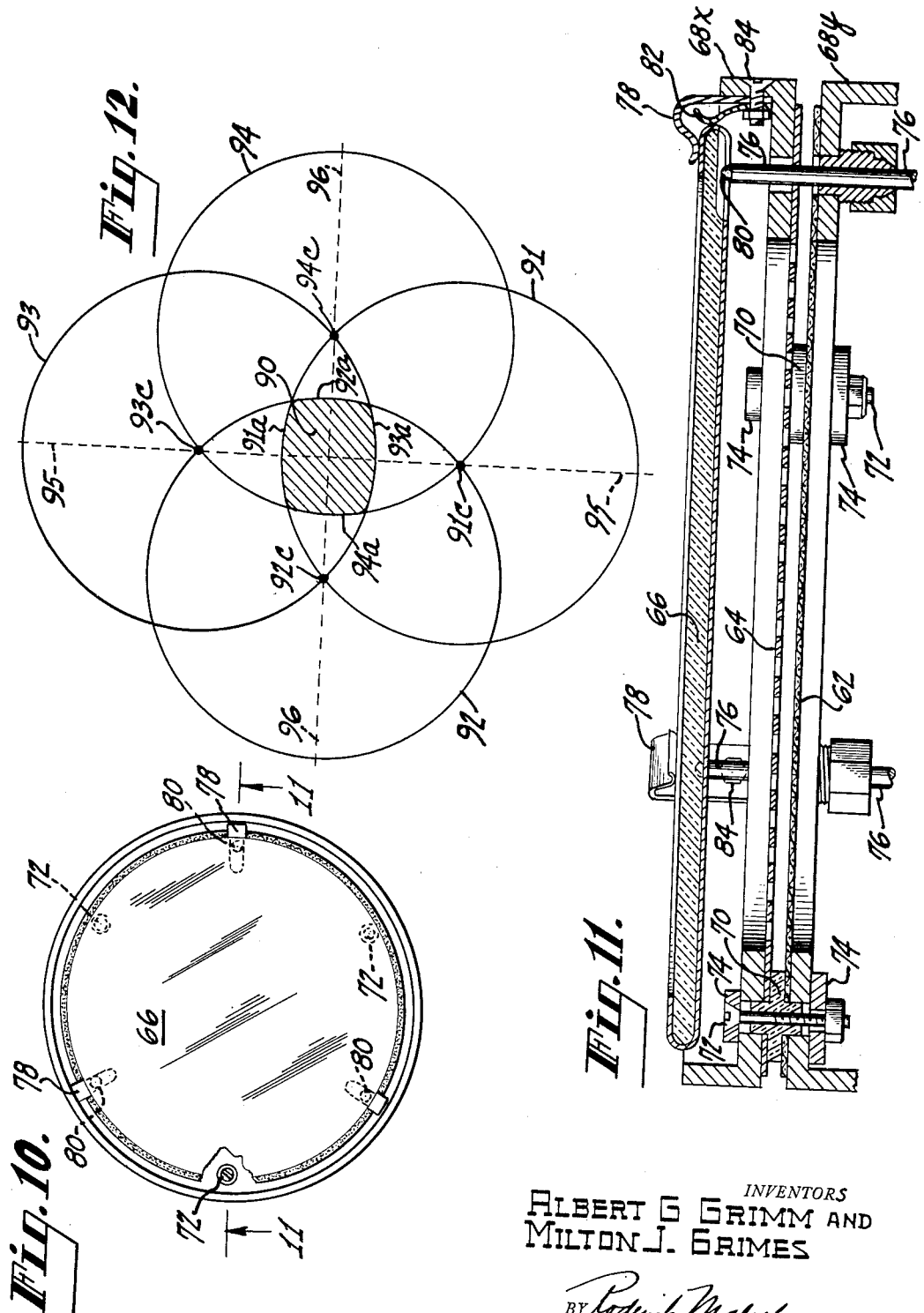

Jan. 31, 1956  A. C. GRIMM ET AL  2,733,366
TARGET ASSEMBLIES FOR COLOR-KINESCOPES, ETC
Filed Nov. 6, 1952
7 Sheets-Sheet 5
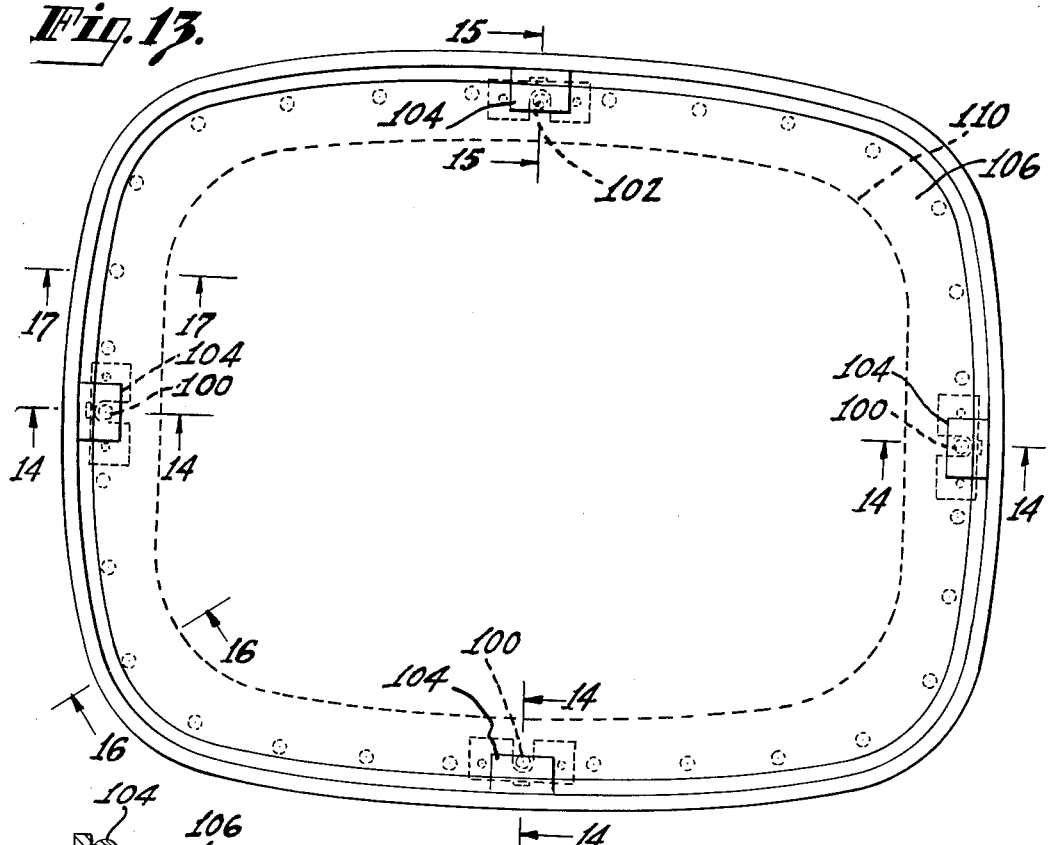
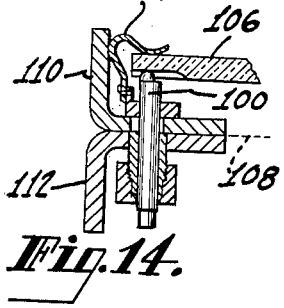
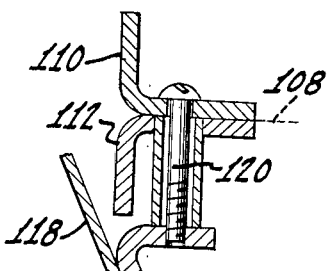
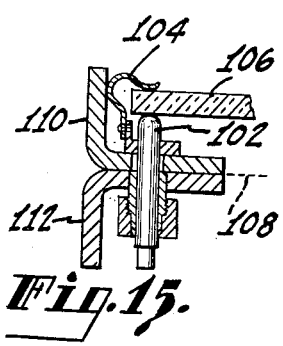
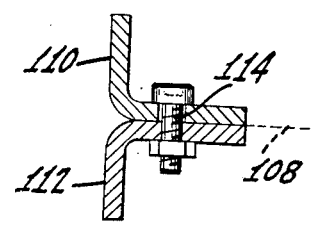
INVENTORS
ALBERT G. GRIMM
AND MILTON J. GRIMES
BY Roderick Malcolm
ATTORNEY Jan. 31, 1956  A. C. GRIMM ET AL  2,733,366
TARGET ASSEMBLIES FOR COLOR-KINESCOPES, ETC
Filed Nov. 6, 1952  7 Sheets-Sheet 6
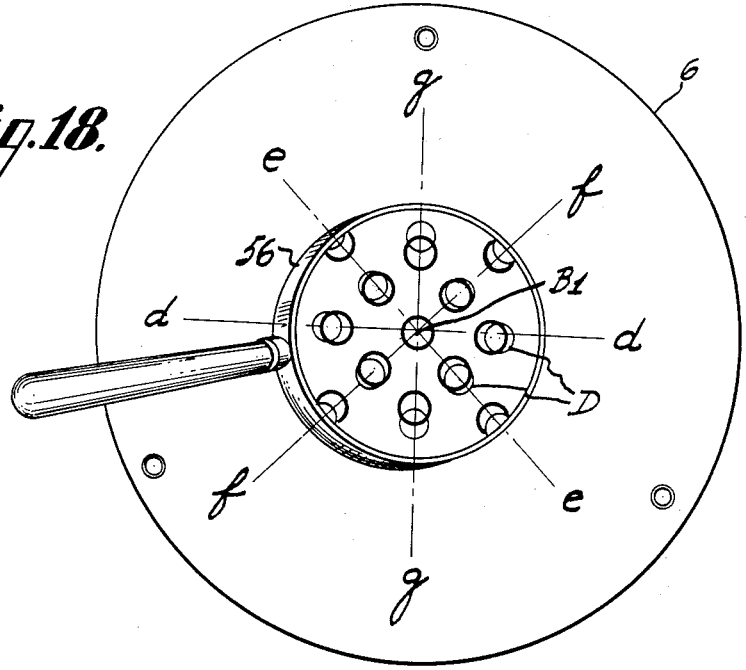
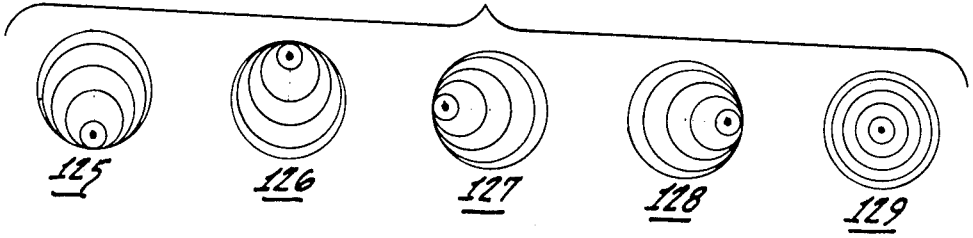
INVENTORS
ALBERT G. GRIMM AND
MILTON J. GRIMES
BY Roderick Malcolm
ATTORNEY

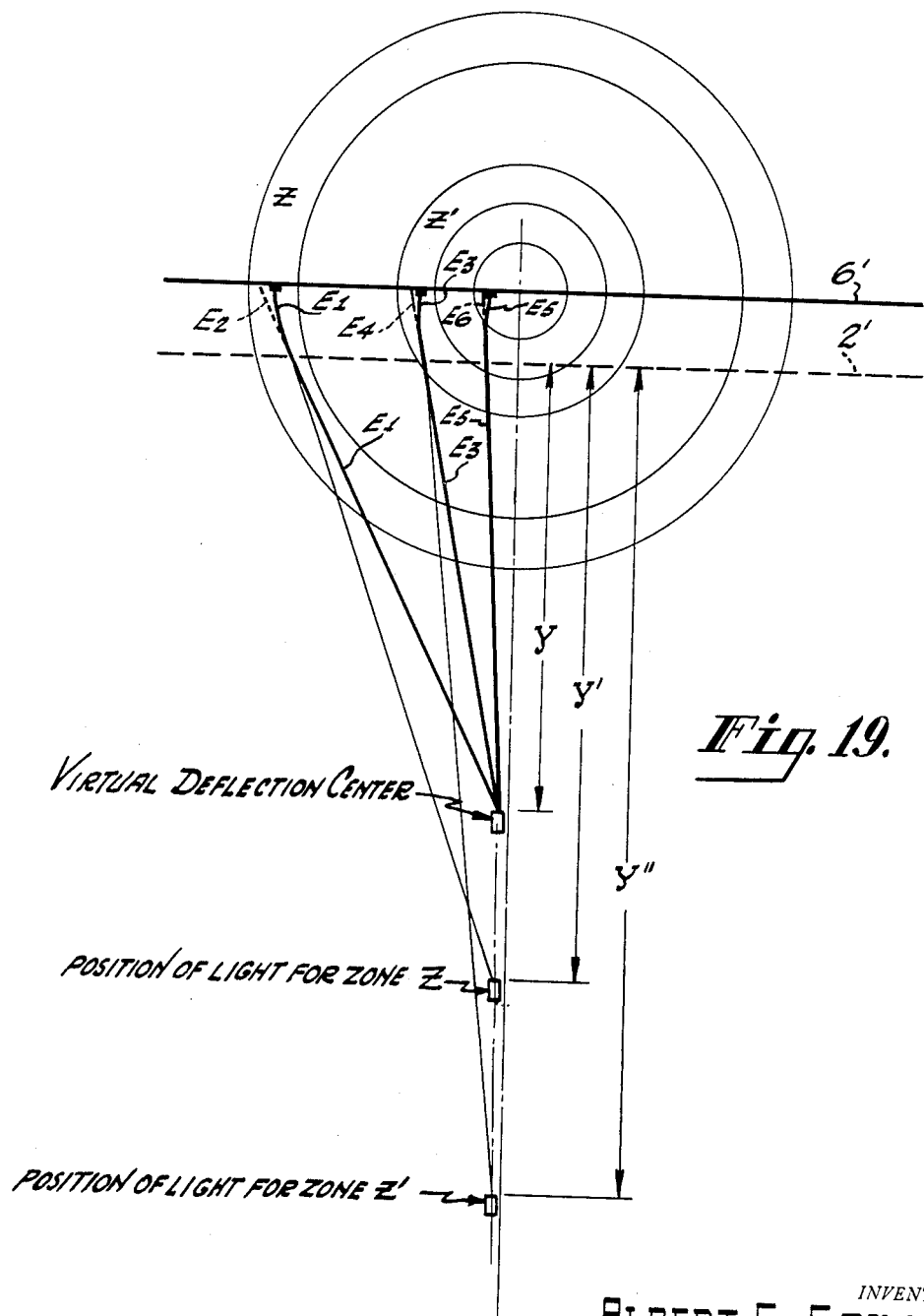

United States Patent Office 2,733,366
Patented Jan. 31, 1956

2,733,366

TARGET ASSEMBLIES FOR COLOR-KINESCOPES, ETC.

Albert C. Grimm, Lancaster, and Milton J. Grimes, Ephrata, Pa., assignors to Radio Corporation of America, a corporation of Delaware Application November 6, 1952, Serial No. 318,984

19 Claims. (Cl. 313—85)

This invention relates to improvements in target-assemblies or "screen-units" for use in cathode-ray tubes of the Crookes-shadow ("masked target") and lenticular-grill ("focused beam") varieties, and has special reference to improvements in the art of manufacturing such target-assemblies and tubes.

The color-screen units used in the kinescopes and camera tubes with which the present invention is especially concerned comprise: (a) one or more foraminous electrodes through the apertures of which electrons pass in their transit from the tube's plane of deflection or "center-of-scan" to (b) a nearby transparent screen-plate having a target surface made up of a multiplicity of groups of dot-like areas of different color-response characteristics and (c) a spacer-frame upon which said electrode and said screen-plate are mounted in the exact position required to permit said dot-like target areas to be activated, selectively, by electrons passing along a plurality of angularly related paths through predetermined ones of the numerous apertures in said masking or focusing electrode (or electrodes).

The exact position of the dot array with respect to the aperture array is different in the different types of tubes. This is so because in tubes of the "Crookes-shadow" or "masked-target" variety (see Schroeder U. S. Patent 2,595,548) the screen and its "mask" are operated at the same potential and the electrons travel in straight paths through the mask-to-screen space. On the other hand, in tubes of the "lenticular-grill" variety (Dr. Flechsig's 1941 French Patent 866,065 and Epstein U. S. P. 3,315,367) the screen and its "grill" (or "grills") are operated at different potentials and create an electron-optical lens-field through which the electrons pass in curvilinear paths in their transit to the screen.

Color-television systems employing color-tubes of the various "dot-screen" varieties cannot achieve the universal acceptance which they obviously merit until such color-tubes can be made available at a price within the means of the general public. The secret, if such it be, of low cost is of course "mass production." It is axiomatic that the key to mass production of vacuum tubes, as well as other "precision instruments," is the adherence on the part of the manufacturer to the high standards of dimensional accuracy required to permit interchangeability of parts. In seeking to achieve mass-production of color-kinescopes in this conventional way, the trend has been toward unattainably high standards in the dimensional accuracy of the spacer-frame and other component parts of the color-screen unit.

Accordingly, the principal object of the present invention is to provide an improved television image tube of the general character described and one which, by reason of the unique construction of its color-screen unit, lends itself readily to mass production irrespective of such appreciable dimensional inaccuracies and other imperfections as are normally encountered in the commercial fabrication and assembly of the component parts of such units.

Another and important object of the invention is to provide a relatively simple, inexpensive and trouble-free method of assembling and testing such color-screen units or "target-assemblies."

The present invention is predicated in part upon a realization of the fact that the solution of the problem of mass production of color-screen units does not reside in the achievement of an extremely high degree of uniformity in the manufacture of the component parts of such units, but rather in certain heretofore unrealized, or at least uncompensated, factors involved in the manufacture and assembly of said component parts.

The principal factor heretofore overlooked in the assembly of such color-screen units is the practical impossibility of subjecting the apertured electrode or "mask" in each of a large number of units to tensioning forces of exactly the same magnitude. Differences in the tensioning forces applied to the apertured electrodes in different units result in at least minute differences in the relative spacing of the apertures in said electrodes. Another cause of differences in the spacing of the apertures has been traced to the fact that the thin metal blanks, from which the masks are formed, are seldom all of exactly the same temperature when the photoengraver's pattern-of-apertures is applied to the thin-metal, prior to the etching process. All such differences in aperture-spacing are magnified by the lever-like movement of the electron-beam and, as a consequence, the beam (or beams) may impinge upon color areas other than the ones upon which they should impinge.

The present invention recognizes that it is substantially impossible, as a practical matter, to achieve exactly duplicate aperture-arrays, or to achieve exactly duplicate tensioning forces in the mounting of the thin-metal "masks" in two or more screen-units. The invention teaches that by the use (a) of attainably isotropic mask-tensioning forces. and (b) of means for varying the spacing and the orientation of the screen-plate with respect to the mask's apertures, the dot-like color-areas on the target surface of any given dot-screen can be brought into alignment with the appropriate apertures in any isotropically tensioned "mask" of appropriate design. The direction (or directions) and the extent of the movement required to bring the color-areas on the screen into registry with the mask's apertures is determined, preferably, at an intermediate stage in the manufacture of the screen (e. g. before its target surface is "metallized") by projecting radiant energy (e. g. light-rays, ultra-violet rays or electrons) upon the mask and observing the pattern produced on the screen by the passage of the rays through the apertures in the mask. The use of an universally adjustable screen-supporting mechanism of a type that can be "locked" in its adjusted position permits the screen plate to be removed from the assembly (e. g. for further processing) and remounted in its previously aligned position without necessarily re-inspecting its alignment.

The invention is described in greater detail in connection with the accompanying seven sheets of drawings, wherein.

Figure 2A:
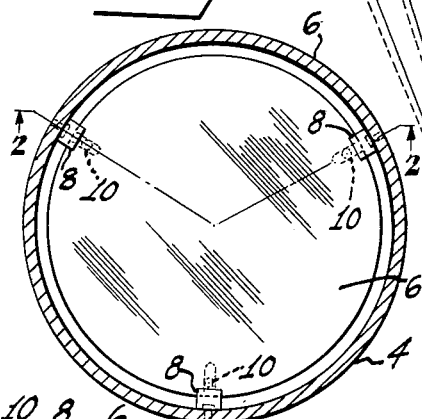
Figure 2:
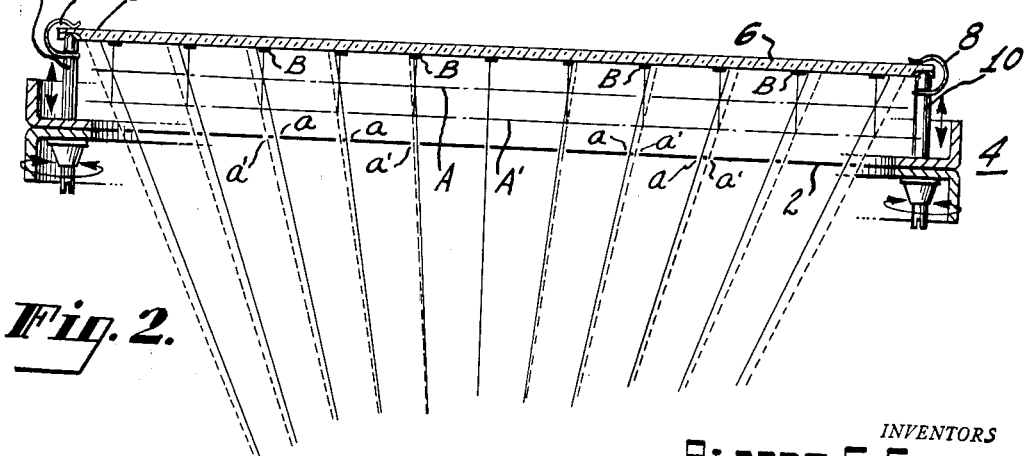

Figure 2 is an enlarged sectional view, taken on the line 2—2 of Figure 2a, of an adjustable color-screen unit constructed in accordance with the principle of the present invention; the drawing being marked with line indicative of different adjustments in the mask-to-screen spacing, as required to compensate for different degrees of misalignment (between the mask-apertures and the screen's color-areas) resulting from a departure from a standard in the intensity of the isotropic tensioning forces applied to the mask;

Figure 2a is a plan view, on a reduced scale, of the adjustable color-screen unit of Figure 2;

Figure 3 is a rear elevational view, with its frame removed, of a preferred form of apertured mask for use in the color-screen unit of Figure 2;

Figure 4 is a view, partly in section, illustrative of the "hot-blocking" technique by which the apertured mask of Figure 3 is given a "shrink-fit" on its frame;

Figure 5 is a view in perspective of a "lighthouse" suitable for use in plotting the location of the color-areas to be applied to the screen, and for determining the alignment of said color-areas with the mask's apertures;

Figure 6 is a fragmentary sectional view on an enlarged scale of a color-screen unit similar to the one illustrated in Figure 2, showing a preferred form of contrivance for adjusting the screen-to-mask spacing and a decorative mask for concealing said contrivance;

Figure 7 is an enlarged fragmentary end-view taken on the line 7—7 of Figure 6; and Figure 8 is a fragmentary view taken on the line 8—8 of Fig. 6 of the glass screen plate showing the eccentric head of one of the screen-supporting posts seated in a V-groove in the glass;

Figure 9 is a section taken on the line 9—9 of Figure 7 showing the fixed end of one of the hold-down springs of Figure 6 and one manner by which said spring is attached to a supporting post;

Figure 10 is a partly broken-away plan view and Figure 11 is a sectional view, taken on the lines 11—11 of Figure 10, of a color-screen unit of the "lenticular-grill" variety, incorporating the invention;

Figure 12 shows a series of non-concentric circles which will be referred to in describing the manner in which one form of "rectangular" color-screen unit may be plotted;

Figure 13 is a front plan view of a color-kinescope containing a "rectangular" color-screen unit embodying the invention;

Figure 14 is a sectional view taken on any of the three lines 14—14 of Figure 13 showing the three principal adjustable-supports for the "rectangular" screen-plate;

Figure 15 is a sectional view taken on the line 15—15 of Figure 13 showing a fourth or auxiliary support or "stop" for the rectangular screen-plate;

Figure 16 is a sectional view taken on the line 16—16 of Figure 13 showing the manner in which the color-screen unit is supported upon the metal wall of the kinescope;

Figure 17 is a sectional view taken on the line 17—17 of Figure 13 showing the manner in which the "mask" of the unit is maintained between the "upper" and "lower" parts of its frame;

Figure 18 is a front elevation, greatly magnified, of the screen when illuminated with radiant energy from the "lighthouse" of Figure 5 and showing an overlap of the radiant dot-pattern and the phosphor dot-pattern; the direction or orientation of the overlap being indicative of the nature of the adjustment required;

Figure 19 is a partly diagrammatic sectional view of the "lighthouse" of Figure 5 with a screen-unit for a "lenticular-grill" tube mounted therein, the drawing being marked with certain reference lines which are referred to in explaining how the alignment procedure is applicable to this type of screen-unit and;

Figure 20 comprises a series of "interference patterns" observed in aligning the dot-array (on the screen-plate) with the aperture-array (in the mask) when the screen-unit is set-up in the "lighthouse" of Figure 5; each pattern being indicative of a direction of movement required to align the dot-array with the aperture-array.

In the prior art, the most accurate way of making color-screen units is to match, by a series of photographic processes, the dot-array (on the target surface of the screen) in each unit with the aperture-array (in the "mask") of that unit. As to this seen the copending application of Harold B. Law, Serial No. 158,901 (now U. S. Patent No. 2,625,734). The Law method compensates for dimensional variations in the aperture array, but does so at the expense of interchangeability. Even if each apertured mask could be made of identical dimensions the present practice of using a particular mask with a particular screen would still have to be employed wherever, as in the prior art, the distance between the mask and the target surface of the screen is fixed by the thickness dimension of the spacer-frame upon which the mask and screen are mounted. This is so because spacer-frames may vary in thickness, or they may deform, however slightly, with a consequent deformation of the location of the individual apertures in the mask. More commonly, the mismatch between the aperture-array and the phosphor array results from the unavoidable differences in the tensioning forces applied to different masks in the "hot-blocking" method employed in mounting them with a "shrink fit" upon their frames. All this will the more readily be apparent upon inspection of Figure 1 which shows what happens when the thin-metal mask of a color-screen unit of conventional construction is subjected to different degrees of tension, such as might occur if an attempt were made to substitute one mask for another apparently "duplicate" mask.

Figure 1:
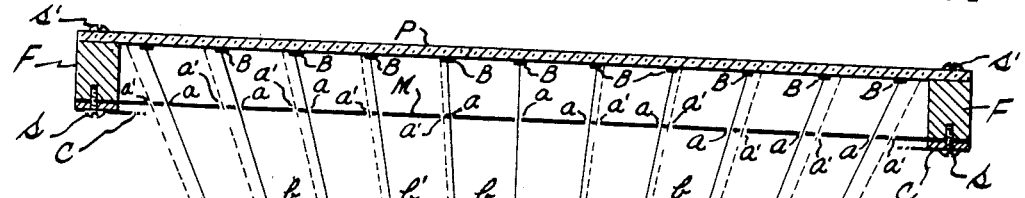
Figure 1 is a schematic view, partly in section, of a color-screen unit of the prior art (wherein the spacing between the color-screen and its mask is fixed by the thickness dimension of a spacer-frame); this figure being referred to in the specification in explaining the problem with which the present invention is especially concerned.
Figure 1A:
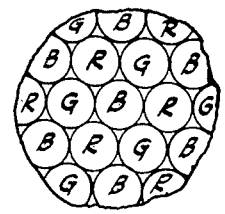
Figure 1a is a fragmentary view, on a magnified scale, of the target surface of the tri-color dot-screen of Figures 1 and 2; the phosphor dots on said surface being arranged in a conventional hexagonal pattern.

In the conventional color-screen unit shown in Figure 1, M designates a thin (say, .004" thick) metal sheet or "mask" containing a multiplicity (say, 200,000) of small (say, 0.009" diameter) apertures $a$ which will be understood to be systematically arranged in a repetitive pattern such, for example, as the hexagonal pattern shown in Figure 6 of Schroeder U. S. Patent 2,595,448. The mask M has a "shrink fit" on the front surface of a solid metal frame F, and is affixed thereon as by means of clamping strips C and screws $s$. As taught in the Law disclosure (U. S. Patent 2,625,734) the "shrink fit" is achieved by heating the mask, as by means of "hot blocks" (28, 29, Figure 4) placed on opposite sides of the mask, to cause it to expand, and then securing it to the frame F while the thin-metal is in its thermally expanded condition. Secured to the opposite side of the frame F, as by screws $s'$ is a color-screen comprising a glass foundation plate P which has on its rear or "target" surface a similar number (e. g. 200,000) of groups of red (R) blue (B) and green (G) phosphor dots (see Figure 1a) arranged in the same systematic (hexagonal) pattern as the apertures $a$ in the thin-metal mask M. In order to simplify the drawing, only the blue phosphor dots (B) are shown in Figure 1.

Accurate registration of the dot-groups with the mask's apertures has heretofore been achieved by taking a photograph of the pattern resulting from the passage of radiant energy (e. g. light-rays or electrons) through the apertures in the already "stretched" mask and then applying the phosphor dots to the screen in the pattern displayed by that particular photograph. If, in an attempt to achieve mass-production, a number of duplicate dot-screens were to be made from the same photograph and used with differently tensioned (but otherwise "duplicate") masks, in a color screen unit of the construction shown in Figure 1, then misregistration and consequent "color-dilution" and other image defects would be apparent in the finished tube. This will be manifest from a close inspection of Figure 1 wherein the reference characters $a$ mark locations of the apertures when the mask M is subject to a tensioning force of a theoretical "standard" intensity and reference characters $a'$ indicate locations of the apertures when the mask is subjected to a slightly different degree of tension. Here if we assume that the phosphor dots B were laid down on the glass plate P with the aid of a photograph taken through the mask M, with the mask's apertures in the relative position indicated by $a$, then the registration is substantially perfect. This is indicated by the solid lines $b$ which show the path of the electron beam from one gun, say the "blue" gun of a three-gun color-kinescope, such as the one shown in Schroeder U. S. Patent No. 2,595,548. Here it will be observed that irrespective of which of the apertures $a$ the "blue" beam $b$, passes it will impinge squarely upon a blue dot (B), since there is a blue dot aligned with each aperture. On the other hand, if we assume that the same screen P is used in conjunction with a mask which is so tensioned that its apertures are in the relative position indicated by reference characters $a'$, then the same "blue" beam, here indicated by the broken lines $b'$, will miss the blue dots and possibly impinge upon dots of a color (say, green) other than the color (blue) upon which it should impinge. The result, of course, is "color-distortion" or "color-dilution" in the televised image sketched by the three beams on the screen P.

An important feature of the present invention is illustrated in Figure 2 which shows a screen-unit wherein the apertured mask, which is here designated 2, and its frame 4, are so constructed (in a manner later described) that the tensioning forces applied to the mask are isotropic and wherein the color-screen 6, instead of being fixed directly on the frame 4, is adjustably supported thereon by a contrivance which includes three springs 8, which hold the screen 6, against three individually adjustable rod-like supports or posts 10, disposed 120° apart about the perimeter of the screen. Here, it will be observed, that if the mask 2, is subjected to isotropic tensioning forces of an intensity such that the apertures in the mask are at the locations indicated by reference characters $a$, the color-dots B on the screen can be brought into register with the said apertures only if the screen-plate 6, is moved into the plane or position indicated by the line A. Similarly, if the isotropic tensioning forces applied to the mask are of an intensity such that its apertures are at locations indicated by reference characters $a'$, the color dots B can be brought into register with the locations $a'$ only if the screen-plate 6 is moved into the plane or position indicated by the line A'.

As above mentioned, the invention contemplates the use of a mask 2 and frame 4, which, when subject to changes in internal stresses and strains, will expand and contract isotropically, i. e., substantially equally in all directions about a common center. The requirements in the case of the mask 2 per se, are (i) that it be constituted of a homogeneous metal, since homogeneous metals possess the property of isotropic thermal expansion when uniformly heated and (ii) that the mask be heated uniformly, for example, as by the "hot blocking" technique, immediately prior to attaching it to its frame. Changes in the spacing of the apertures in the mask due to deformation of the frame, per se, can be made isotropic by the use of a frame which deforms uniformly. This situation can most easily be achieved by using a frame of circular contour. Of course, a frame of any other shape can be used if it is of such a nature that its deformation is extremely small. (The exact degree of non-uniform deformation that can be tolerated is discussed later on in this specification in connection with Figure 13, which shows the invention as applied to a "rectangular" color-screen unit.)

Figure 3 shows an apertured electrode or mask 2 of a circular form which has proven especially satisfactory in the practice of the mass production method of the invention. The homogeneous material of which the mask is formed may comprise, by way of example, a copper (70%), nickel (30%) alloy, 0.004" thick and which, in one case, was approximately 12.9" in diameter. As in the Schroeder patent (U. S. Patent No. 2,595,548), the apertures through which the electrons travel in their transit from the tube's plane of deflection to the viewing screen are arranged in a hexagonal pattern, i. e. each aperture, except those adjacent to the marginal edges of the mask, is surrounded by six other apertures. In the interest of simplifying the drawing only one complete group (of seven) apertures $a$ is shown in Figure 3. (Ordinarily a mask of the indicated dimensions contains at least 200,000 apertures and may contain 300,000 or more apertures.)

Three radially extending slots 12 spaced 120° apart on the periphery of the mask 2 accommodate the posts 10 (Figure 2) upon which the screen-plate is adjustably supported. The slots 12 are very slightly wider than the posts to avoid any binding action when the mask is subject to thermal expansion.

Attention is here called to the fact that the mask 2 should, preferably, be so oriented that the path of-scan (in the tube for which the screen unit is designed) is along one of the diagonals (say the "horizontal" diagonal $d—d$ Figures 3 and 18) of the hexagonal pattern of apertures in the mask. Thus if we assume that the frame 4 (Figure 2) upon which the mask 2 is supported is to occupy a certain fixed position in the finished tube, then the (hexagonal) pattern of dot-like apertures in the mask must be properly oriented in its frame if the beam is to be scanned along said (horizontal) diagonal. This is taken care of by properly locating the three slots 12 (through which the screen-mounting posts 10 extend) relative to the selected diagonal. Specifically, in the instant case the triangularly disposed slots 12—12—12 are so arranged that two of them (the "lower" two) define a line $d'—d'$ which is parallel to the horizontal diagonal $d—d$ of the hexagonal aperture-array.

A number (in this case, twenty-four) of holes 14 adjacent to the periphery of the mask receive the screws 16 (Figure 4) which provide the force that clamps the mask 2 between the oppositely located parts $4x—4y$ (Figure 4) of its frame 4. The mask 2 is also provided on its periphery with a number (in this case, sixty-six) of equally spaced narrow slits 18 (say 0.75" deep and 0.005" wide) which prevent the mask from warping by preventing stresses and strains from being set up in the marginal edge of the mask, between the relatively cold frame parts.

As taught in the Law disclosure (U. S. Patent No. 2,625,734) the masks may be made by a photoengraving etching process. If the pen and ink drawing, or photograph of the original pattern, contains one or more minor imperfections (e. g. in the size, shape or relative spacing of the apertures) said imperfections will be duplicated not only in each mask but in each screen-plate as well. (As will hereinafter more fully appear the dot-pattern on the screen-plates is derived from a photograph of the aperture array in whichever mask has been selected as a "master.") Such minor imperfections can be tolerated and indeed may go entirely unobserved provided that the imperfections in the mask lie in register with the corresponding imperfections in the dot-pattern on the screen-plate. The first step in this direction is to make sure that all of the masks have the same general orientation in their frames. (In this connection it is apparent that the 120° separation of the slots 12, for the posts 10, permit the mask to be mounted on its frame in any of six positions, including "up-side down.") This step is facilitated by providing the periphery of each mask with two tabs 20 and 22 of different size or shape whose relative position indicate to the observer which side of the mask is "up." In the drawing wherein the larger tab 20 is at the bottom of the circle and the smaller tab 22 is to the left of the larger tab, the rear or target surface of the mask is "up." Obviously, if all of the masks (in a given batch) are given the same general orientation, as indicated by the relative position of the tabs 20 and 22, then any imperfections in the masks' apertures will be in the same quadrant in all of the masks.

In carrying out the mass production method of the invention the preferred practice is to start with the number of glass plates (6), frame elements (4) and (unmounted) thin-metal masks (2) required to produce a desired quantity of complete color-screen units. Next, each of the masks 2 is mounted in its frame 4. The substantially isotropic tensioning forces required in the mounting of the circular thin-metal masks can best be achieved by the hot-blocking method described by Law, and illustrated in Figure 4.

Referring now to Figure 4: The circular frame 4 for the mask 2 must be of very sturdy construction and preferably comprises two steel rings $4x$ and $4y$ which are L-shaped in cross-section. Each ring is provided with holes 24 in the horizontal arm of its L for the reception of clamping screws 16. Thus when the two L-shaped frame members $4x$ and $4y$ are united in the described position by means of the clamping screws 16 and nuts 26 the frame has the enhanced mechanical strength and rigidity which is characteristic of T-shaped and analogous (e. g. I-shaped) angular mechanical structures.

The thin-metal disc or mask 2 is placed between the horizontal arms of the rings $4x$ and $4y$, with its holes 14 in register with the holes 24 of both rings, and the screws 16 are placed loosely in position in said aligned holes 14 and 24. The loosely assembled frame elements $4x$, $4y$ and mask 2 are then placed over a circular hot metal block 28 and a similar hot block 29 is placed on or adjacent to the top surface of the mask to heat it to a temperature (say, 100° C.) well above room temperature. The diameter of the hot blocks 28 and 29 is preferably smaller than the inner diameter of the frame members $4x$ and $4y$, so that the heating effect of said blocks 28 and 29 is confined substantially to the thin-metal mask 2.

Heating the thin-metal mask 2 by means of the hot blocks 28 and 29 causes it to expand isotropically. Immediately thereafter the nuts 26 on the screws 16 are tightened to clamp the mask 2 in its isotropically expanded condition. Upon cooling, the mask contracts isotropically and is thus rendered isotropically taut in its frame.

Since, as above mentioned, the mask 2 is constituted of a homogeneous alloy, it will expand isotropically when subjected to the heating action of the hot blocks 28, 29. However, the degree of isotropic thermal expansion will seldom be exactly the same in the case of any two masks when mass-production is involved; nor is it necessary that it should be where the assembly method dictated by the present invention is followed.

One of the framed masks 2 is selected as a "master" for use in plotting the location of the sub-elemental color areas to be applied to the target surface of the screen-plate 6. The plotting operation may involve the use of electrons (as in Law application Serial No. 277,133) or light rays. In the latter case (as taught in Law U. S. Patent No. 2,625,734) a "lighthouse" 30 similar to the one shown in Figure 5 may be used. This apparatus comprises an arbor 32 which terminates at one end in base portions 34 which fit on or about the circular frame 4 for the mask 2, and at its other end, in a small disk 36 containing three holes $38r$, $38b$, $38g$ through any one of which diffused light rays from a shielded lamp 40 may be directed upon the apertured mask 2. A photographic plate 42 is mounted on the other side of the apertured mask 2, in relatively the same plane that the screen-plate 6 is to occupy in the finished tube.

In the "lighthouse" of Figure 5 the distance between the apertured mask 2 and the apertured disk 36 is actually or virtually (e. g. proportionately) the same as the distance between the mask and the "center-of-scan" of the finished cathode-ray tube. (The "center-of-scan" or "plane of deflection" is the plane, or virtual plane, in which the axis of each deflected beam, when extended rearwardly, intersects the axis of origin of said beam.)

The triangular distribution of the holes $38r$, $38b$, $38g$ in the disk 36, as here shown, corresponds to the "delta" arrangement of the electron-guns in the 3-gun color-kinescope of the Schroeder patent (U. S. Patent 2,595,548).

With the disk 36, mask 2 and photographic plate 42 arranged in the above described relationship, light rays (not shown) from the lamp 40 are passed through one of the holes, say the "blue" hole $38b$ in the disk 36. These rays then pass through all of the numerous holes $a$ in the mask 2 and produce upon the photosensitive plate 42 a pattern of dots which, when duplicated on the target surface of the screen-plate 6, is accessible to an electron-beam having the same "center-of-scan" and angle-of-approach as said light rays. The number of dot-like areas marked on the photographic plate 42 by the light-rays passing through the holes in the mask 2 is only one-third the number of sub-elemental phosphor areas required when the screen is to be used in a tri-color kinescope. However, a stencil or a printing plate made (as by a conventional photoengraving process) from such a photographic exposure can be used for printing all three colors of a tri-color screen simply by shifting the position of the stencil or printing plate the distance of one color-area prior to laying down the second and third colors.

The stencil (or stencils) or printing plate (or plates), not shown, made from the photograph taken through the "master" mask may be used in laying down the color areas on any desired number of screen plates 6. Use of the same stencil or printing plate makes each color-screen a substantial duplicate of every other color-screen. However, the fact that the color-screens are all duplicates does not in itself permit the use of a randomly selected screen with a similarly selected mask since, as previously set forth, slight differences in the tensioning forces applied to the masks in mounting them on their frames result in significant differences in the spacing of the mask apertures and a consequent misalignment of said apertures with the color areas on the screens.

The adjustments in the screen assembly required to permit the use of a "duplicate" screen 6, with a "non-duplicate" framed mask 2 may be made either before or after all three of the sub-elemental color (R, B and G, Figure 1a) areas have been printed on the target surface of the screen-plate and, in any event may be made before said surface is subjected to the usual "metalizing" operation. (This is helpful because the light-rays, or ultra-violet rays, employed in the aligning operation, do not penetrate the electron-transparent light-reflecting metal-film applied to this and other television color-screens for the purpose of rendering such screens electrically conductive.)

Where, as above described, the screen is (a) mounted, (b) adjusted, (c) removed and (d) re-mounted before it is ready for use, it is desirable that the adjustable supports for the screen operate to receive the re-mounted screen and to "center" it in the precise position to which it was adjusted prior to its removal. Such a self-centering universally adjustable screen-support is illustrated, generally, in Figure 2 and is shown in section in Figure 6.

The contrivance shown in Figure 2 and, in section, in Figure 6 for supporting the screen plate 6 is capable not only of moving said plate toward and away from the apertured mask 2 but also of moving it about, and tilting it with respect to, an axis normal to the plane of the mask. The number of places at which the screen-plate 6 is supported preferably corresponds to the minimum number of points required to define a plane, i. e., three. The places at which the plate 6 is supported are defined by three radially extending tracks in the form of V-shaped grooves 46 spaced 120° apart about the periphery of said plate. The grooves 46 may be about 0.05" deep and extend inwardly from the edge of the screen-plate 6 to a point say, 0.25" from said edge. As shown more clearly in Figure 7 the bottom surfaces $46a$ of these V-grooves, and the inner extremities $46b$ thereof (see Figure 8) are preferably slightly rounded, to minimize the possibility of fracturing the glass by eliminating points of high stress concentration. Each V-groove 46 comprises a seat for an eccentrically disposed hemispherical terminal 48 on the end of each of the supporting posts 10. Each of the posts 10 is mounted to permit of independent axial and rotatable movement in the bore of a split stud or collet 50 which is brazed or welded onto the lower section 4y of the mask-supporting frame 4. The collet 50 has a conical outer surface which is threaded to receive the threaded inner surface of a complementarily shaped nut 52. Screwing the nut 52 up on the split body of the collet 50 causes the latter to exert a clamping force on the post 10 and thus to maintain it in any selected position. The other or free end of each post 10 terminates in a kerf (or a "flat") 54 which when turned by a screwdriver (or wrench), not shown, urges the eccentric head 48 on the upper end of the post against a side wall of its grooved seat 46 and moves the screen-plate 6 in whichever plane has been fixed by the axial adjustment of the posts 10. The springs 8 are bowed over the edge of the screen-plate 6 and, as shown at 8n in Figure 9, are notched to facilitate their attachment at the other end to the posts 10. Alternatively, as shown in Figure 11, the hold-down springs may be supported on the upper section of the mask-frame. The springs 8, when finally assembled serve to hold the grooved surfaces 46 of the plate 6 into engagement with the rounded, eccentrically supported, terminals 48 on the adjustable support rods 10.

From the foregoing description of the mechanism for adjusting the position of the screen plate 6 with respect to the apertured mask 2 it will be apparent that when the screen-plate 6 is removed from its support rods 10, as for further processing, it can subsequently be remounted thereon exactly in its original, adjusted, position without further adjustment, since it is only when the plate is in that exact position that its V-grooves 46 can be fitted onto the eccentric heads 48 of said rods 10. If desired the hold-down springs 8 and the other elements of the screen-adjusting mechanism can be concealed from view by means of a bezel or decorative escutcheon 56 (Figure 6) supported as by tongues 58 in notches or holes 60 in the upstanding arm of the upper part 4x of the frame 4.

The precise adjustment or adjustments required to bring the color areas on a given screen-plate into register with the apertures in a given mask may be determined (by any of the three methods, later described) by setting up the color screen unit in the "lighthouse" (30, Figure 5) and observing the pattern or patterns produced by the passage of radiant energy through the apertures in the mask. However, before proceeding to the description of the various methods by which the dot array (on the screen-plate) can be aligned with the aperture array (in the mask), it may be well to illustrate the fact that the invention is not limited in its useful application to color-screen units containing but a single apertured "mask" or a single "focusing electrode" nor to one wherein said electrode or electrodes are of circular contour.

Figures 10 and 11 show the invention as applied to a color-screen unit of the "plural-grill focused-dot" variety. Here, as described by Edward G. Ramberg in copending application Serial No. 277,182, the "first" grill comprises a wire screen 62 of very fine mesh and the "second" grill or focusing electrode comprises an apertured thin-metal plate 64 similar to the "mask" 2 shown in Figure 3 but having somewhat larger apertures therein. Where the metallized phosphor-dot screen 66 and the second focusing-grill 64 are operated at the same potential, and a different potential is applied to the first grill 62, the screen-plate 66 must be electrically insulated from the first grill. Accordingly, the two L-shaped frame members which are here designated 68x and 68y are spaced from each other by an insulating material which may take the form of a ceramic ring or a series of blocks 70 of the required thickness. The two focusing electrodes or grills 62 and 64 are supported at their edges between the frame members (68x and 68y) and the opposite surfaces of the insulating inserts (70). A series of screws 72, which are insulated from the focusing electrodes 62 and 64, and from the frame members 68x and 68y, as by insulating washers 74 provide the requisite clamping force. The three-point, universally adjustable screen-supporting mechanism is essentially the same as that described in connection with Figures 2 and 6 to 9 inclusive. Here, however, the adjustable screen-supporting rods, which are designated 76 are constituted of an insulating ceramic material, instead of metal. In addition to the springs 78 which hold the grooved screen-plate 66 against the eccentric heads 80 of the supporting rods 76, an auxiliary spring 82 is provided adjacent to each post for preventing undesired lateral movement of the screen-plate 66. In the instant case the "hold down" springs 78 and the auxiliary springs 82 are supported on the vertical arm of the upper L-shaped frame member 68x as by means of screws 84.

As previously mentioned, the color-screen units of the present invention need not be circular in shape. They may, for example, be of a "rectangular" contour. The term "rectangular," in addition to its usual meaning, is intended here to include a shape 90 (Figure 12) the boundaries of which are defined, substantially, by the arcs 91a, 92a, 93a, 94a of four intersecting circles 91, 92, etc., the centers 91c and 93c of two of which are on a line 95—95 perpendicular to the line 96—96 joining the other two centers 92c and 94c; the distances between the centers of the two pairs of circles (91 and 93; 92 and 94) being different.

Referring now to Figs. 13 to 17 inclusive: In applying the invention to a rectangular color-screen unit the three universally adjustable supporting posts, here designated 100 are disposed, respectively, on three of the four sides of the "rectangle." In accordance with one feature of the invention, in the case of a "rectangular" unit, the points of support fall on the major and minor axes of the rectangle. Thus, here two of the supporting posts 100 are on the major (or "horizontal") axis of the screen-plate and the third post is on a minor axis normal to said major axis. If the above mentioned arrangement is not followed any deformation of the frame would be transmitted to the glass screen-plate and shift the center of said plate away from the center of the mask, thus making more difficult the permanent alignment of said plate with the mask.

When the screen-plate has been aligned with the mask (e. g. by any of the three methods later described) a fourth support 102 and hold down spring 104 (see Figure 15) support the screen-plate 106 and prevent it from sliding off its supporting posts when the unit is tilted. This fourth or auxiliary support 102 may be of any suitable construction provided that it does not interfere with the operation of the "ball and groove" adjusting mechanism for the screen-plate. Thus, when as shown in Figure 15, the fourth or auxiliary support for the screen-plate takes the form of a vertically movable rod 102, the end of said rod should rest upon a plane surface portion of the screen-plate 106 (instead of in a V-groove). In this "rectangular" screen-unit, as in the earlier described circular screen-units, the frame upon which the mask 108 and the screen-supporting elements 100, 102 are supported, comprises two L-shaped frame members 110, 112 held together by screws 114 (Figure 17). As described in the copending application Serial No. 195,588 of R. D. Faulkner et al., the color screen unit may be supported, as by means of bolts 120, upon three or more studs 116 (Figure 16) which are welded on the inner surface of a metal tube envelope 118.

In designing a "rectangular" color-screen unit for mass production it must be recognized that the bending moment of a "rectangular" frame is not the same as it is in a circular frame; that is to say it is not zero. If mass production were not desired this fact would be of little importance since the pattern of dots in the screen-plate could then be derived from a photograph of the aperture array in the mask which is to be used with that particular screen-plate. On the other hand, where "mass production" is involved, one is confronted with the fact that the bending moment of one "rectangular" frame may not be exactly the same as it is in another seemingly "duplicate" frame. These non-uniform differences in the bending moments of different frames may not be compensated, in their entirety, by manipulating the adjusting mechanism for the screen-plate. Thus in addition to the invention as above described, further improvements may be employed. For example, the non-uniformity in the mask-tensioning forces applied to the apertured electrode or mask by the frames in different "rectangular" color-screen units can be compensated for in part by altering the spacing and orientation of the screen-plates and in part by limiting the effective diameter of the beam in the tubes for which said units are designed. In this latter connection it will be appreciated that if the phosphor-dots on the screen-plate are tangent to each other (as they are in Figure 1a) and the effective diameter of the beam is the same as that of the dots then, obviously, no non-uniform mask-tensioning forces can be tolerated. If, on the other hand, the diameter of the beam is made smaller than that of the dots, the beam may depart in any direction from its normal or intended path a distance corresponding to the difference in the two diameters without causing it to strike more than one color-dot at one time.

The effective diameter of the electron-beam (or beams) is determined in different ways in different tube types. In tubes of the Crooke's-shadow (or masked target) variety, shown in Figures 2, 6 and 13, it is determined, primarily, by the diameter of the apertures in the mask and, to a very minor extent, by the unavoidable spreading of the beam in the space between the mask and the screen-plate. Accordingly, in applying the invention to a mass-produced "rectangular" color-screen unit for use in a tube of the masked-target variety the apertures in the mask may be made slightly smaller than they ordinarily are in tubes of similar dimensions wherein the dot-array on the screen-plate is derived from the particular mask which is to be used with that screen-plate.

In the above connection it should be borne in mind that limiting the effective diameter of the beam ordinarily results in a decrease in the light output from the screen-plate. Hence any such limitation should, preferably, be kept to a minimum. One way of doing this is to make the mask-frames of very rugged construction, so that the differences in the bending moment of the mass-produced frames is extremely small. A mathematical analysis of the stresses and strains applied to a "rectangular" frame similar to the one shown in Figure 13 shows that the maximum distorting forces applied to the frame by the mask (when it is attached to the frame by the previously described "hot-blocking" technique) occur for the most part at the corners and, to a lesser extent, on the long sides of the rectangle. Thus it is practical to devise a frame of the necessarily rugged construction, yet of minimum weight, by re-inforcing said parts or sections of the frame. As will be seen upon close inspection of Figure 13, the "reinforcement" of the long-sides and corners of the frame may take the form of an extension of the horizontal or "back-to-back" arms of the two L-shaped frame members. Thus, in one case where the frame members were made of cold-rolled steel, 0.125 inch thick, and measured eleven-inches on their longest diagonal, excellent performance was achieved when the minimum dimension of the frame (i. e. on its short sides) was 0.8" and its maximum width (i. e. at the corners and long sides of the rectangle) was 1.05". In this case the diameter of the phosphor dots (R, B and G, Figure 1a) on the screen-plate was 0.0138". The diameter of the apertures in the mask was 0.009". The mask-to-screen spacing was approximately 0.372". Under these conditions the diameter of the beam(s) was 0.0118" at its point of impact on the phosphor dots. Thus, when the dot-array was aligned with the aperture array the latter could be displaced (e. g. by deformation of the frame) as much as 0.002" without producing any color-dilution whatsoever.

In applying the invention to a "rectangular" screen unit of the "lenticular grill" variety, shown in Figure 11, it may be more convenient to limit the effective diameter of the beam ahead of the screen-unit, as by reducing the diameter of the stopping aperture in the electron-gun or guns of the tube.

*Alignment methods, generally*

In setting-up the color-screen unit in the "lighthouse," for the alignment operation, the posts 10 (Figures 2, 6; 100, Figures 13, 14) which support the screen-plate 6 (Figures 2, 6; 106, Figures 13, 14) should first be turned on their axes to a position whereat their eccentric heads or balls 48 (Figure 7) are all toward the center of the unit.

Irrespective of which (of the following three) alignment procedure is used, the first step is to make sure that the right trios of (red, blue and green) phosphor dots on the screen-plate are associated with the right mask apertures. (In this connection it has already been pointd out that any imperfections in the size or shape of the mask apertures are duplicated in the pattern of phosphor dots on the screen-plate and will be less likely to be observed if said imperfections are in register with each other in the finished unit.) This first step in the alignment operation can be facilitated by deliberately introducing a few imperfections in the original drawing used in laying-down the pattern of etched apertures in the mask. Thus, as shown by the black dots a1, a2, a3 in Figure 3, three apertures may be omitted from the pattern of apertures in the mask, preferably at non-uniformly spaced points near its periphery (i. e. beyond the normal range or "raster" of the electron beam and hence beyond the image-reproducing area on the screen). Since the phosphor dots are laid down on the screen-plate in the pattern disclosed by a photograph taken through the mask, an entire trio of phosphor dots will be missing from the screen-plate at each of the points (a1, a2, and a3) where the light failed to penetrate the mask. These correspondingly located "imperfections" in the peripheral portions of the mask and screen are readily observed when the light in the "lighthouse" is turned on, and can be registered, to a first approximation (i. e. within the "throw" or arc of movement of its eccentrically disposed "ball" supports 48) by rotating the supporting posts so that the screen-plate 6 is shifted in a plane substantially parallel to the plane of the mask. With the color screen unit set up in the "lighthouse," in the manner above described, any of the following methods may be employed in bringing the dot array into exact registry with the aperture array.

*I. "Direct observation" method*

This method of aligning the dot array (on the screen-plate) with the aperture array (in the mask) is described in connection with Figures 18 and 19. Said method possesses the advantage that it is applicable to color-screen units of both the "mask target" ("Crooke's-shadow") and "lenticular grill" ("focused beam") varieties. Its disadvantage, if such it be, is that a magnifying glass is ordinarily required in its practice.

In applying the "direct observation method" to the alignment of a color-screen unit for use in a kinescope (of the "masked target" variety) wherein the mask and the screen-plate are to be operated at the same potential; the first step is to so orient the screen-plate 6 that at least one of the phosphor dots at or near the center of said plate is in register with the corresponding aperture at or near the center of the mask. This can be done irrespective of the mask-to-screen spacing simply by turning the mounting posts 10 without changing the effective lengths of said posts.

When the screen-plate has been turned to a position whereat at least one of its dots (say, the one designated B¹ in Figure 18) is located on an axis which intercepts the center of the dots-of-light produced by the radiant energy, the next step is to bring the rest of the color-dots into a position whereat the light-dots D overlap the color-dots, if at all, only in radial directions from the said centrally located dot (B¹) or axis. The adjustment required to get the "overlap" along said different radii ($d$—$d$, $e$—$e$, $f$—$f$, $g$—$g$, Figure 18) is, of course, a rotary one and, like the second mentioned adjustment, is made by turning the screen-supporting posts 10 without changing the effective length of said posts. The final adjustment required to bring all of the color-dots into register with the light-dots (and hence with the apertures in the mask) involves changing the spacing between the screen-plate and the mask. Whether said spacing is to be increased or decreased is dictated by the direction (along the radii $d$—$d$, $e$—$e$, etc., Figure 18) in which the light-dots overlap the color-dots. If the light-dots overlap the color-dots in the direction of the perimeter of the screen-plate then said plate needs to be moved closer to the mask, and vice versa. This final adjustment is effected by moving the screen-supporting posts 10 in the direction required to bring the screen-plate into its proper plane. When the nuts 52 (Figure 6; and hence the conical split-studs or collets 50) have been tightened, the screen-plate 6 may be removed from its supports for further processing. Thus, if as is entirely practical, the above described alignment method has been carried out at a stage whereat the dots of but a single color have been printed on the screen then the other colored dots may be applied and the screen may be metallized (as by a thermal evaporation process, in vacuo) before being restored to its position on its supporting posts 10.

In applying the invention to a color-tube of the "lenticular-grill" or "focused beam" variety (wherein the color-screen and its grill or grills are operated at different potentials) the location of the color-dots on the screen may be plotted by the electronic plotting method described by Harold B. Law in copending application Serial No. 277,133, filed March 18, 1952. That is to say, the photographic plate (42 Figure 5) and the grill or grills (or fascimiles thereof) are preferably set up in a demountable vacuum tube (not shown) containing an electron-gun (in place of the lamp 40, Figure 5) and the beam from the gun is subjected to an electric field which directs the beam to the photographic plate along the same curved paths it is to follow in its transit to the screen of the finished tube. When all the color-dots of at least one color have been printed on the screen-plate, in the pattern disclosed by the photograph, either the screen-plate or the developed photographic plate may be set up with the other elements of the screen unit in the lighthouse of Figure 5 for the alignment operation.

In performing the alignment operation upon a color-screen unit of the lenticular-grill variety, with the aid of the "lighthouse," it is necessary to compensate for the fact that the rays in the "lighthouse" travel in straight lines whereas in the finished tube the electron-beam or beams travel in curvilinear paths in approaching the screen-plate. As explained below in connection with Figure 19, the required compensation is effected by altering the spacing between the light source and the screen unit, as by sliding the disc 36 and the lamp 40 to a predetermined position on the arms 32 of the pedestal 30.

In Figure 19: The solid lines E1, E3 and E5 show the trajectory of an electron beam in a typical lenticular-grill kinescope wherein the screen-plate 6' is maintained at a higher potential than the lens grill 2'. It will be noted that the beam path is curved after passing through the lens grill 2' and that the displacement of the position of the leading end of the electron beam from the shadow mask case (shown by the broken lines E2, E4 and E6) varies with the angle of scan. However, if the position of the landing points of the curved beams (E1, E3, and E5) are projected back through the grill openings to the axis of "center-of-scan" the intersection of these rays with this axis will determine the position for the light source, in the lighthouse (Figure 5), for any given zone Z (Z' etc.) on the screen-plate. Thus, if all of the phosphor screen except a selected zone Z is masked, and the light (40 Figure 5) moved to the proper position (Y or Y' etc.) for that zone, the alignment step may be performed in the same manner as described in connection with the Crooke's-shadow type of color-tube. If it is desired to check more than one zone, the light source can be moved to the appropriate position for the new zone.

II. *"Interference pattern" method*

Adjusting the position of the screen-plate by the "direct observation" method described in connection with Figures 18 and 19 involves the observation, with the aid of a magnifying glass, of the individual phosphor dots and the individual dots of light projected on said plate through the mask. An equally accurate yet more rapid method which dispenses in whole or in part with the use of a magnifying glass involves the observation of the interference pattern occasioned by the passage of light through the apertured mask and through the screen-plate. As observed from any point around the lighthouse the interference pattern comprises a series of rings disposed one within another. The pattern is particularly bright and clear when the light source comprises diffused monochromatic light, e. g. from a sodium vapor bulb. Properly interpreted the relative arrangement of the interference rings indicates to the observer just what adjustments of the screen-supporting rods are required to bring the dot-array (on the screen) into register with the aperture-array (in the mask). Figure 20 shows five such interference patterns as viewed by an observer looking into the screen-plate from a point above one of the adjusting rods 10. It will be assumed that the eccentric heads (48, Figures 6 and 7) on said rods were all initially turned toward the center of the assembly.

Referring in detail to Figure 20: If the interference rings are arranged in the pattern shown by reference numeral 125 (wherein the center of the innermost ring is toward the observer) the screen-plate is too far away from the mask. Hence the effective length of the rod nearest the observer should be decreased. The pattern 126 (wherein the center of the innermost rings is away from the observer) indicates that the screen-plate is too close to the mask. Hence an increase in the effective length of said adjusting rod is required. Pattern 127, on the other hand, indicates that the screen-plate should be turned counter-clockwise and pattern 128 indicates a clockwise adjustment of said plate, is required, e. g. with the aid of a screw driver or other tool, as mentioned in connection with the description of Figure 6. The three supporting rods 10 are independently adjustable, hence the observer should adjust them separately as dictated by the interference pattern which he observes from a position above that particular post. When the interference pattern comprises a series of concentric rings, as shown at 129, when viewed from all points around the lighthouse, the dot array on the screen is perfectly aligned with the dot-array in the mask.

III. *"Color dilution" method*

The monochromatic light source 40 (Figure 5) which is preferably used in the above described "direct observation" and "interference-pattern" methods does not "excite" the color-phosphor dots on the screen-plate. The subject "color-dilution" method of aligning the color-screen (6) and mask (2) requires the use of a source of radiant energy capable of causing said phosphors to glow, each in its allotted color. Electron-rays, though possessing this property, can not conveniently be employed since their use requires that the "lighthouse"

(Figure 5) be enclosed in a vacuum. Accordingly, ultra-violet rays (e. g. from a General Electric Co. type VA-2 lamp) are employed.

The ultra-violet lamp (not shown) is simply substituted for the lamp 40 shown in the "lighthouse" of Figure 5. The illuminating effect of the ultra-violet rays upon the red phosphor (e. g. zinc phosphate; manganese activated) dots R (Figure 1a) is not as pronounced as it is upon the blue (e. g. zinc sulphide; silver activated) and green (e. g. zinc silicate; manganese activated) phosphors. Accordingly, the alignment procedure is preferably conducted with the ultra-violet lamp mounted in the lighthouse-position (38b or 38g, Figure 5) corresponding to the position of either the "blue" beam or the "green" beam in the tube for which the color-screen unit is designed. With the lamp thus mounted it is apparent that if the phosphor dots (on the screen plate 6) are perfectly aligned with the apertures (in the mask 4) only the blue dots will be excited when the lamp is in the "blue" position (38b) and only the green dots will be excited when the lamp is in the "green" position (38g). On the other hand if the screen-plate is not perfectly aligned with the mask the screen will not glow pure blue or pure green but will exhibit different or diluted hues or colors (which may include some red) as determined by the direction and degree of misalignment. Since the position of the lamp and the desired pure color is known to the operator, it is a simple matter to select the post or posts (10) which require adjustment.

From the foregoing description it is believed apparent that the present invention provides improved color-television image tubes which, by reason of the unique construction of their color-screen units, lend themselves readily to mass production methods irrespective of such appreciable dimensional inaccuracies and other imperfections as are normally encountered in the commercial fabrication and assembly of the component parts of such units.

What is claimed is:

1. A target assembly comprising: a first target-element containing a multiplicity of systematically arranged apertures, a second target-element having a target surface made up, effectively, of a multiplicity of electron-sensitive areas disposed in a systematic pattern which is geometrically related to the pattern of apertures in said first target-element, fixed supporting means for one of said target-elements, and universally adjustable supporting means for bringing the other of said target-elements to a position whereat said apertures are accurately aligned with respective ones of said groups of electron-sensitive areas.

2. A target assembly for use in a cathode-ray tube, said assembly comprising: an electrode containing a multiplicity of systematically arranged electron-transparent areas, a screen-plate having a target surface made-up, effectively, of a multiplicity of groups of electron-sensitive image-areas disposed in a systematic pattern which is geometrically related to the pattern of systematically arranged electron-transparent areas in said electrode, a plurality of supporting elements for said screen-plate each mounted for independent longitudinal and rotational movements with respect to an axis normal to a plane of said planar electrode, and means responsive to said independent longitudinal and rotational movements of said screen-supporting elements for subjecting said screen-plate to universal movement with respect to said electrode whereby to bring said screen-plate into a position whereat said systematically arranged groups of electron-sensitive image-areas are in a desired position with respect to said systematically arranged electron-transparent electrode areas.

3. The invention as set forth in claim 2 wherein said electrode is supported in a frame and said plurality of supporting elements for said screen-plate are supported on said frame.

4. The invention as set forth in claim 2 and including means for locking said supporting elements for said screen-plate.

5. The invention as set forth in claim 4 and wherein said screen-plate is removably mounted upon said lockable supporting elements whereby said screen-plate may be removed from and returned to its said desired position without unlocking said supporting elements.

6. A target assembly for a cathode-ray tube comprising a thin-metal electrode containing a multiplicity of systematically arranged apertures, means including a frame for applying substantially isotropic tensioning forces to said thin-metal electrode to render it taut, a screen-plate having a target surface presented across an intervening space to the apertures in said electrode, said target-surface comprising a multiplicity of electron-sensitive image-areas disposed in a pattern of groups which is geometrically related to the pattern of said systematical arranged apertures, and universally adjustable means including a plurality of screen-supporting elements mounted in substantially equally spaced relation on said frame and screen-plate for moving said plate to a position whereat each of said groups of electron-sensitive image areas is in register with a different one of the apertures in said isotropically tensioned apertures electrode.

7. The invention as set forth in claim 6 and wherein said frame and said screen-plate are of circular contour and wherein the number of said screen-supporting elements comprises the minimum number required to define a plane.

8. The invention as set forth in claim 6 and wherein said frame and said screen-plate are of "rectangular" contour and wherein said screen-supporting elements are located on the major and minor axes of said screen-plate.

9. The invention as set forth in claim 8 wherein the apertures in said thin-metal electrode and the electron-sensitive image areas on the target surface of said screen-plate are of circular contour, the diameter of said apertures beng sufficiently less than the diameter of said image-areas to compensate for image-defects which otherwise would be present by reason of minor inequalities in the tensioning forces applied to said thin-metal electrode by said rectangular frame.

10. A target assembly for use in a color-television image tube, said assembly comprising: a screen-plate having a target-surface containing a plurality of V-shaped grooves extending a limited distance radially inward toward the center of said surface from spaced points about the boundaries thereof, a multiplicity of groups of electron-sensitive image-areas of different color-response characteristics disposed in a systematic pattern on said target-surface, a thin-metal electrode disposed adjacent to said target-surface and containing a multiplicity of apertures corresponding in number and in distribution to the number and distribution of the groups of image-areas on said screen-plate, means including a frame for applying substantially isotropic tensioning forces to said apertured thin-metal electrode, a plurality of supporting elements for said screen-plate mounted on said frame for independent longitudinal and rotational movements with respect to an axis normal to the plane of said isotropically tensioned apertured electrode, each of said supporting elements terminating in an eccentrically disposed rounded protuberance dimensioned to contact the inclined surfaces of said V-grooves and thus adapted to translate said independent longitudinal and rotational movements of said supporting elements into a force capable of moving said screen-plate in any direction required to align the groups of electron-sensitive areas thereon with the systematically arranged apertures in said isotropically tensioned thin-metal electrode.

11. In the art of manufacturing cathode-ray color tubes of the kind having a center-of-scan and containing a color-screen unit comprising: (a) a taut thin-metal electrode having a multiplicity of systematically arranged dot-like apertures therein through which beam-electrons pass along different angularly related paths in their transit from said center-of-scan to (b) a screen-plate having a target surface made up of a multiplicity of systematically arranged groups of dot-like electron-sensitive target areas of different color-response characteristics and (c) a frame upon which said apertured electrode and said screen-plate are supported in spaced-part relationship with the differently colored dot-like target area of each group located at the terminals of respectively different ones of said angularly related electron-paths; the method of making interchangeable parts for color-screen units of the type described and of assembling said parts in their said relative position to provide a desired number of operative color-screen units irrespective of minor departures from a standard in the tensioning forces employed in securing each apertured electrode tautly on its frame; said method comprising the following steps: (1) making a desired number of substantially duplicate frames, plates and electrodes, (2) placing said electrodes, respectively, on said frames, (3) heating said electrodes to expand the thin-metal of which they are comprised, (4) applying substantially isotropic tensioning forces to said expanded thin-metal electrodes to render them taut on their frames, (5) projecting radiant energy upon a selected one of said taut electrodes from a point corresponding to a point at the center-of-scan of said cathode-ray tube, (6) taking a photograph of the pattern resulting from the passage of said radiant energy through the apertures in said selected electrode, (7) applying electron-sensitive materials of said different color-response characteristics to each of said desired number of screen-plates in the pattern of dots disclosed by said photograph and in accordance with the required systematic dot-group arrangement, (8) adjustably securing each of said screen-plates to its frame, (9) projecting radiant energy from said center-of-scan-point upon the apertured electrode of each assembly and (10) adjusting the spacing and orientation of each screen-plate to bring it into a position whereat the dot-like electron-sensitive areas thereon are in register with the dot-like pattern of radiant energy passing through the apertured electrode which is associated with said screen-plate.

12. The invention as set forth in claim 11 and including the following additional steps: (11) locking the adjustable supports for each screen-plate in the position required to maintain the screen-plate in its adjusted position, (12) removing each screen-plate from its locked supports, (13) metalizing the electron-sensitive target surface of said screen-plates and then (14) remounting each of said screen-plates upon its previously locked adjustable supports.

13. The invention as set forth in claim 11 and wherein the radiant energy applied to the target surface of said screen-plate is of a wave-length capable of actuating at least one of the electron-sensitive materials thereon.

14. In the art of manufacturing cathode-ray color tubes of the kind having a center-of-scan and containing a color-screen unit comprising: (a) a taut thin-metal electrode having a multiplicity of systematically arranged dot-like apertures therein through which beam-electrons pass along different angularly related paths in their transit from said center-of-scan to (b) a screen-plate having a target surface made up of a multiplicity of systematically arranged groups of dot-like electrons sensitive target areas of different color-response characteristics and (c) a frame upon which said apertured electrode and said screen-plate are supported in spaced-apart relationship with the differently colored dot-like target area of each group located at the terminals of respectively different ones of said angularly related electron-paths; the method of making interchangeable parts for color-screen units of the type described and of assembling said parts in their said relative position to provide a desired number of operative color-screen units irrespective of minor departures from a standard in the tensioning forces employed in securing each apertured electrode tautly on its frame; said method comprising the following steps: (1) making a desired number of substantially duplicate frames, plates and electrodes, (2) placing said electrodes, respectively, on said frames, (3) heating said electrodes to expand the thin-metal of which they are comprised, (4) applying substantially isotropic tensioning forces to said expanded thin-metal electrodes to render them taut on their frames, (5) projecting radiant energy upon a selected one of said taut electrodes from a point corresponding to a point at the center-of-scan of said cathode-ray tube, (6) taking a photograph of the pattern resulting from the passage of said radiant energy through the apertures in said selected electrode, (7) applying an electron-sensitive material of at least one of said color-response characteristics to each of said desired number of screen-plates in the pattern of dots disclosed by said photograph, (8) adjustably securing each of said screen-plates to its frame, (9) projecting radiant energy from said center-of-scan-point upon the apertured electrode of each assembly, (10) adjusting the spacing and orientation of each screen-plate to bring it into a position whereat the dot-like areas thereon are in register with the dot-like pattern of radiant energy passing through the apertured electrode which is associated with each screen-plate, (11) locking the adjustable supports for each screen-plate in the position required to maintain the screen-plate in its said adjusted position, (12) removing each screen-plate from its locked supports, (13) applying electron-sensitive materials of the other of said color-response characteristics to each of said screen-plates in the dot-like pattern disclosed by said photographic plate and in accordance with said systematic group arrangement and then (14) remounting each of said screen-plate upon its said previously locked adjustable supports.

15. A mounting for the target-electrodes of a target-assembly of the masked-target variety, said mounting comprising, a rigid base for one of said target-electrodes, at least three supporting elements protruding from said base about the edge of said one of said target electrodes, the other of said target-electrodes including a marginal edge portion containing at least three track portions on which the free-ends of said supporting elements are adapted to be seated and, when thus seated, to support said second mentioned target-electrode a predetermined distance from, and with a predetermined orientation with respect to, said first mentioned target-electrode; at least two of said track portions of said second target-electrode having axes that intersect within the target area thereof whereby said second target-electrode may be removed from said supporting-elements and subsequently re-seated thereon substantially exactly in the position prescribed by said predetermined distance and orientation.

16. The invention as set forth in claim 15 and wherein said free-ends of said supporting elements are unequally spaced from one another whereby said second target electrode may be removed therefrom and subsequently re-seated thereon only in said prescribed position.

17. An electrode assembly of the masked target variety comprising an electron sensitive target electrode, a mask electrode containing a multiplicity of apertures, and means for mounting said electrodes relative to each other with a predetermined spacing and orientation between the active surfaces thereof; said means comprising at least three supporting elements protruding from one of said electrodes near the marginal edge thereof, at least three spaced seats on the other electrode near the marginal edge thereof in which said supporting elements are seated, and quick-releasable means holding said elements and said seats in engagement, whereby said electrodes may be separated and subsequently re-assembled substantially exactly in the same relation as prescribed by said predetermined spacing and orientation.

18. An electrode assembly as set forth in claim 17, wherein said seats are grooves formed in said other electrode and having non-parallel axes.

19. An electrode assembly as set forth in claim 17, wherein said last-named means comprises at least one spring engaging said electrodes.

References Cited in the file of this patent

UNITED STATES PATENTS

| 2,635,205 | Olson | Apr. 14, 1953 |
| 2,637,829 | Trad | May 5, 1953 |
| 2,682,620 | Sanford | June 29, 1954 |

FOREIGN PATENTS

| 589,345 | Great Britain | June 18, 1947 |